United States Patent [19]
Morse et al.

[11] 3,920,046
[45] Nov. 18, 1975

[54] ADAPTIVE BRAKING MODULATOR FOR AIR-BRAKED VEHICLES

[75] Inventors: Robert J. Morse; Milan J. Sebo, both of Elyria, Ohio

[73] Assignee: The Bendix Corporation, South Bend, Ind.

[22] Filed: Jan. 17, 1974

[21] Appl. No.: 434,171

Related U.S. Application Data

[63] Continuation of Ser. No. 199,109, Nov. 16, 1971, abandoned.

[52] U.S. Cl. .......................... 137/627.5; 303/21 F
[51] Int. Cl.² ..................................... B60T 8/10
[58] Field of Search ............... 137/627.5; 303/21 F

[56] References Cited
UNITED STATES PATENTS

| | | | |
|---|---|---|---|
| 3,286,734 | 11/1966 | Hartshorne | 303/21 F X |
| 3,525,555 | 8/1970 | Meyer et al. | 137/627.5 X |
| 3,620,577 | 11/1971 | Neisch et al. | 303/21 F UX |

Primary Examiner—Robert G. Nilson
Attorney, Agent, or Firm—Ken C. Decker; William N. Antonis

[57] ABSTRACT

An adaptive braking modulator is disclosed for use in a vehicle having brake actuated by pressurized air. The modulator includes a housing having an inlet port, an outlet port, and an exhaust port. Differential pressure responsive valve means within the housing normally permits uninhibited flow of fluid between the inlet and outlet ports and prevents flow of fluid to the exhaust port, but terminates fluid communication between the inlet and outlet ports and permits communication between the outlet and the exhaust port at a controlled rate when an adaptive braking cycle is initiated. Electrically operated valve means are provided which reduces the pressure on one side of the differential pressure valve means to actuate the latter.

18 Claims, 3 Drawing Figures

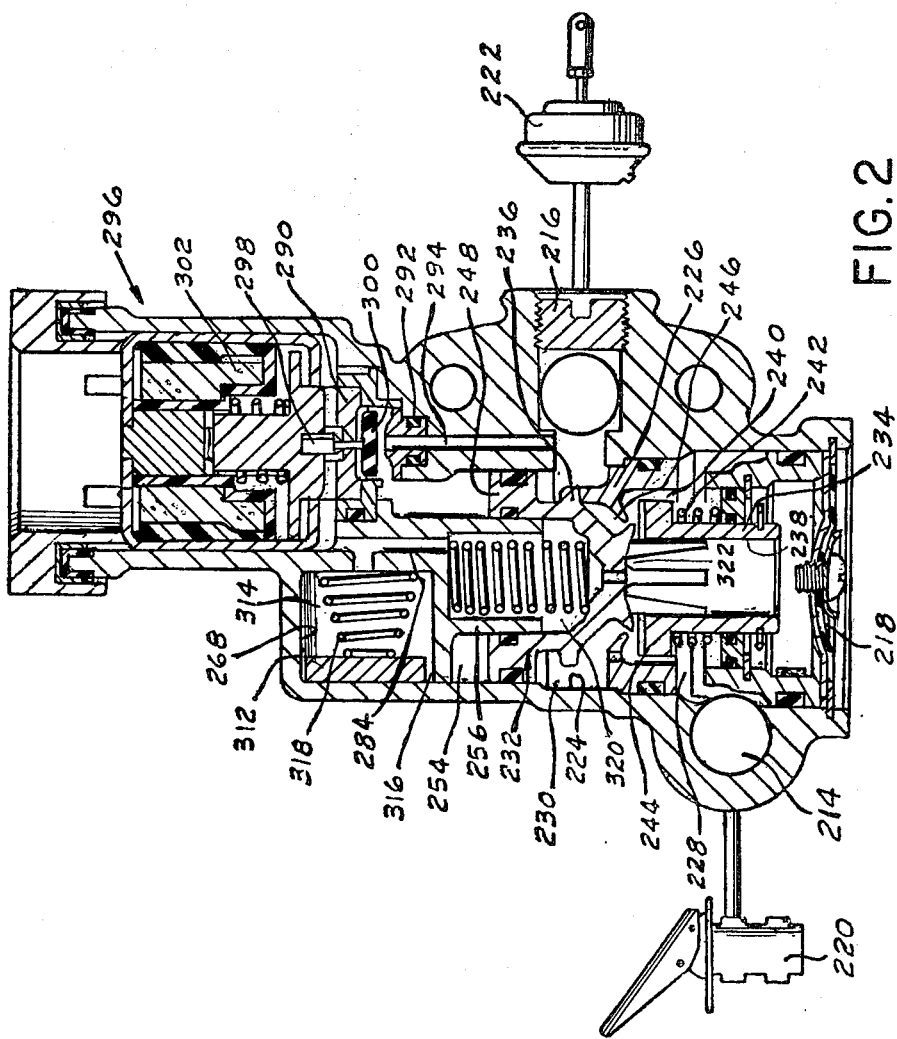

ADAPTIVE BRAKING MODULATOR FOR AIR-BRAKED VEHICLES

This is a continuation of application Ser. No. 199,109, filed Nov. 16, 1971, now abandoned.

BACKGROUND OF THE INVENTION

This invention relates to a modulator for an adaptive braking system for vehicles having brakes actuated by pressurized air.

While adaptive braking systems for vehicles having air-actuated brakes have been proposed before, they have usually been quite sophisticated and have consequently been available only at a relatively high price. Therefore, it has become necessary to provide a relatively low cost adaptive braking system, which includes a simplified modulator that controls pressure fluid communication to the brakes of the vehicle. However, to insure proper control of the vehilce's braking action, the modulator must provide a rather abrupt drop in the fluid pressure level delivered to the controlled brake when an adaptive braking cycle is initiated, followed by a subsequent reduction in braking pressure at a lesser rate. The modulator must also be capable of increasing braking pressure delivered to the vehicle's brakes at a controlled rate, so that the braking action of the vehicle is controlled in such a manner that the vehicle is brought to a safe stop without locking the vehicle's wheels.

SUMMARY OF THE INVENTION

Therefore, an important object of our invention is to provide an adaptive braking modulator which may be manufactured at a substantially lower cost than other modulators known in the prior art.

Another important object of our invention is to provide a modulator for an adaptive braking system that provides an initial abrupt drop in braking pressure when an adaptive braking cycle is initiated, followed by a controlled reduction in pressure of the brakes at a lesser rate, to prevent wheel lock-up.

Another important object of our invention is to provide a relatively low cost adaptive braking modulator which is also capable of both releasing and building pressure delivered to the brakes of the vehicle at a controlled rate.

DESCRIPTION OF THE DRAWINGS

FIG. 2 is a view similar to FIG. 1, but illustrating an alternate embodiment of our invention;

DETAILED DESCRIPTION

Figure 1:
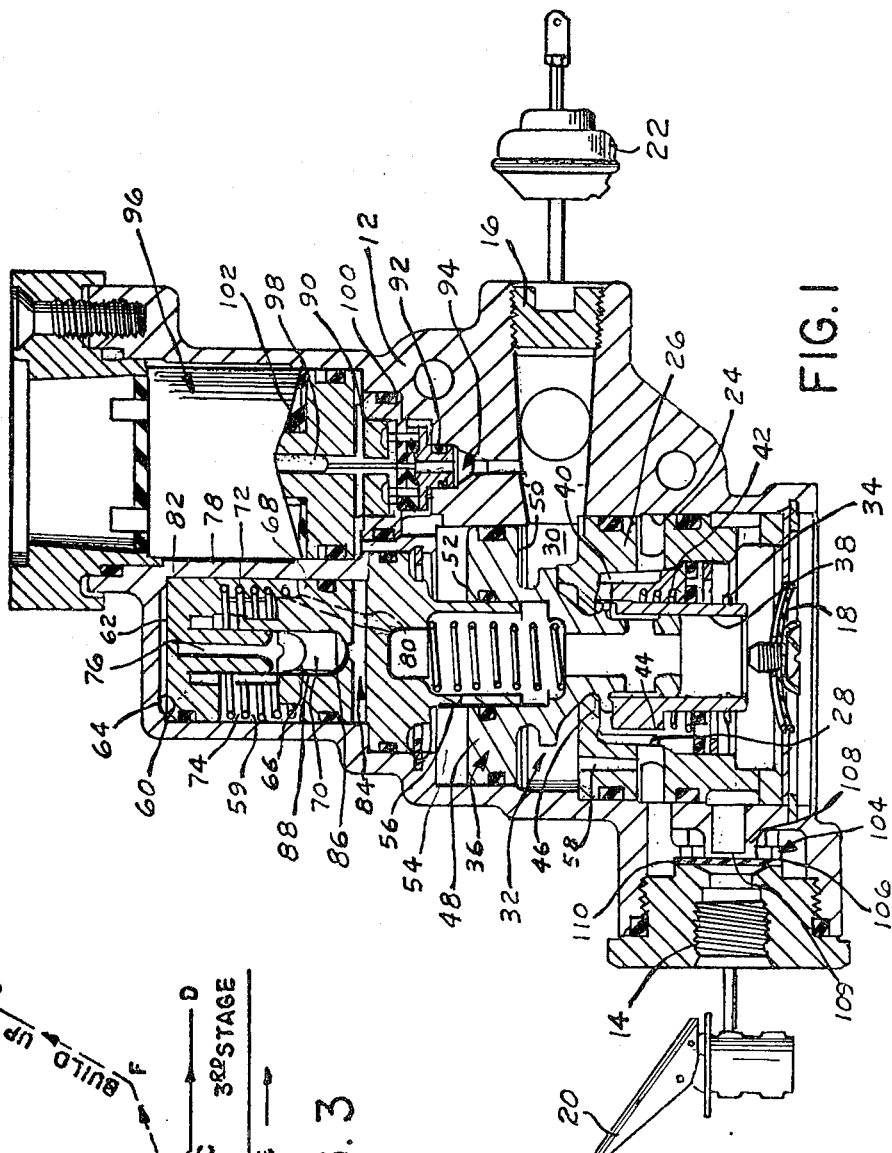
FIG. 1 is a longitudinal cross sectional view of an adaptive braking modulator made pursuant to the teachings of our present invention.

Referring now to FIG. 1 of the drawings, an adaptive braking modulator generally indicated by the numeral 10 includes a housing 12 having an inlet port 14, an outlet port 16, and an exhaust port 18. Pressure fluid communication to the inlet port 14 is controlled by a conventional brake valve 20 which is mounted in the operator's compartment of the vehicle. The outlet port 16 is communicated to a conventional air brake chamber 22, which is adapted to actuate the brakes of the vehicle. The housing 12 defines a bore 24 therewithin which communicates the inlet port 14 with the outlet port 16 and the exhaust port 18. A valve seating member 26 is mounted within the bore 24 and divides the latter into an inlet chamber 28 and an outlet chamber 30. Differential pressure responsive valve means generally indicated by the numeral 32 includes a first valve member 34 and a second valve member 36. The valve member 34 defines a passage 38 therewithin which extends through the valve member 34 and communicates the bore 24 with the exhaust port 18. The face seal 40 is secured to one end of the valve member 34 and a first spring 42 yieldably urges the face seal 40 into engagement with the valve seating member 26, to thereby terminate fluid communication between the inlet and outlet ports. The first valve member 34 further includes an annular area 44 against which fluid pressure in the chamber 28 acts, so that the combined force of the fluid pressure in the chamber 28 and the force of the spring 42 maintains the valve member 34 in sealing engagement with the seating member 26 whenever the fluid pressure level in the inlet chamber 28 exceeds the fluid pressure level in the outlet chamber 30 by a predetermined amount.

The second valve member 36 includes a circumferentially extending lip 46 which is adapted to sealingly engage the face seal 40 on the valve member 34. The diameter of the lip 46 is less than the diameter of the opening through the valve seating member 26 so that the lip 46 may freely move therethrough. The second valve member 36 further includes a piston 48 which is slidably and sealingly mounted in the bore 24. One face 50 of the piston 48 is exposed to the fluid pressure in the outlet chamber 30 and the other face 52 of the piston 48 cooperates with the end of the bore 24 to define a control chamber 54 therebetween. A second spring 56 has a spring constant greater than the first spring 42, and yieldably urges the lip 46 into sealing engagement with the face seal 40 and thereafter urges the first and second valve members 34 and 36 downwardly as a unit viewing FIG. 1 so that the face seal 40 is urged out of sealing engagement with the valve seating member 26 to permit fluid communication between the inlet and outlet chambers. A flow restricting orifice 58 extends through the valve seating member 26 and permits flow of fluid at a limited rate between the inlet and outlet chambers even when the face seal 40 is sealingly engaged with the valve seating member 26.

A second bore 59 is provided within the housing 12 which slidably receives a plunger 60. The plunger 60 has a larger diameter end 62 which cooperates with one end of the bore 59 to define a chamber 64 therebetween, and a smaller diameter end 66 which cooperates with a guide member 68 which closes the other end of the bore 59 to define a compartment 70 therebetween. A spring 72 is disposed in a compartment 74 defined between the large diameter portion of the plunger and the guide member 68. Spring 72 urges the plunger 60 away from the guide member 68. Passage means generally indicated by the numeral 76 extends through the plunger 60 to communicate the compartment 70 with the chamber 64. A flow restricting orifice 78 extends through the larger diameter section of the plunger to permit limited flow of fluid between the chamber 64 and the compartment 74. Another passage 80 communicates the chamber 74 with the exhaust port 18. A pin 82 carried by the guide member 68 extends through the orifice 78 to prevent contaminants from obstructing flow of fluid through the orifice.

A passage 84 communicates the control chamber 54 to the compartment 70 through an inlet opening 86. The inlet opening 86 cooperates with a seal 88 carried on the smaller diameter end of the plunger 60 in a manner more completely described hereinafter. A valve seating member 90 is provided in the passage means 84 which faces another valve seating member 92 which is disposed in another passage 94 which communicates the control chamber 54 with the outlet chamber 30.

A solenoid valve generally indicated by the numeral 96 includes an armature 98 which extends through the valve seat 90 and carries a resilient valve member 100 in the chamber between the valve seats 90 and 92. A coil 102 is provided to actuate the valve member 100 from a first position sealingly engaging the valve seat 90 when the coil is not energized to a second position sealingly engaging the seat 92 when the coil 102 is energized. The coil 102 is actuated by an electronic control unit (not shown) containing logic which responds to wheel acceleration and deceleration to provide a signal for actuating the coil 102. The logic may be of any suitable design well known to those skilled in the art, such as the logic disclosed in copending U.S. Patent Application Ser. No. 81,481, filed Oct. 16, 1970, owned by the assignee of the present invention, and incorporated herein by reference.

A quick release valve generally indicated by the numeral 104 includes a diaphragm 106 and a valve seat 108. When the fluid pressure level in the inlet port 14 is greater than the fluid pressure level in the inlet chamber 28, the central portion 109 of the diaphragm 106 is urged into sealing engagement with the valve seat 108 to prevent fluid communication therethrough, and the outer circumferential edge 110 of the diaphragm 106 is deflected to prevent flow of fluid from the inlet port 14 into the inlet chamber 28. On the other hand, when the pressure in the inlet chamber 28 is greater than the pressure in the inlet port 14, the diaphragm 109 is forced away from the valve seat 108 to permit communication therethrough between the inlet chamber 28 and the exhaust port 18.

MODE OF OPERATION

The various components of the modulator 10 are illustrated in FIG. 1 in the position which they assume during a normal brake application when an adaptive braking cycle is not required. In this position, the lip 46 is sealingly engaged with the face seal 40 to prevent fluid communication from the outlet chamber 30 to the exhaust port 18 and the seal 40 is urged away from the valve seating member 26 to permit substantially uninhibited fluid communication between the inlet chamber 28 and the outlet chamber 30. Since the valve member 100 is disposed away from the valve seat 92, substantially uninhibited fluid communication is permitted through the passage 94 between the outlet chamber 30 and the control chamber 54, thereby providing substantially equal fluid pressures across the piston 48. Therefore, since the fluid pressures acting upon the valve member 36 are cancelled, the spring 56 maintains the valve members 36 and 34 in the positions illustrated in the drawings.

Figure 3:
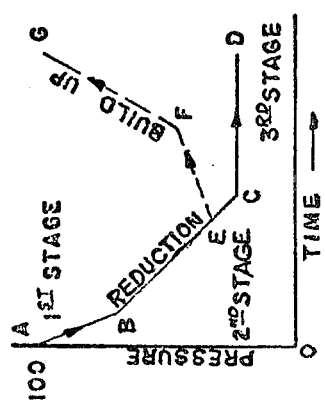
FIG. 3 is a graphical representation of the operation of the device illustrated in FIG. 1.

When the electronic control unit (not shown) senses an incipient skid condition of the controlled wheel, the electronic control unit signals the solenoid valve 96 which urges the valve member 100 from a first position illustrated in the drawings to a second position in which the valve member 100 sealingly engages the valve seat 92 to prevent fluid communication through the passage 94 and in which flow of fluid is permitted between the control chamber 54 to the compartment 70 through the passage 84 and the inlet opening 86. Fluid pressure in the compartment 70 is communicated into the chamber 64 through the passage means 76. Since the chamber 64 is at substantially atmospheric pressure due to communication between the orifice 78, the compartment 74, and the passage 80, the pressure level in the control chamber 54 drops rather abruptly, thereby permitting the higher fluid pressure in the outlet chamber 30 to urge the first valve member upwardly viewing the FIG. 1 so that the face seal 40 engages the valve seat 26 to terminate fluid communication between the inlet and outlet chambers, and therafter lip 46 moves away from the face seal 40 to permit communication between the chamber 30 and the exhaust port 18 at a fairly rapid rate, as represented by line A–B in FIG. 3.

However, fluid pressure communicated into the chamber 64 acts upon the larger end of the piston 60 while fluid pressure in the compartment 70 acts upon the smaller end of the plunger 60 so that a force is exerted on the latter which opposes the spring 72 to thereby drive the seal 88 into sealing engagement with the inlet opening 86. However, sealing engagement between the elements 88 and 86 is only momentary, since pressure is being exhausted from the chamber 64 at a controlled rate through the orifice 82. The plunger 60 will eventually stabilize in a position such that the seal 88 cooperates with the inlet opening 86 to define a flow-restricting orifice therebetween such that fluid is admitted into the chamber 64 at exactly the same rate as fluid leaves from the chamber 64 through the orifice 78. Since pressure will be exhausted from the control chamber 54 at the same rate at which pressure is exhausted from the chamber 64, a relatively small pressure differential will exist between the chambers 54 and 30. Since the size of the orifice defined between the lip 46 and the face seal 40 is directly proportional to the pressure differential across the piston 48, pressure exhausts from the outlet chamber 30 at a controlled rate substantially the same as the rate of pressure egress from the chamber 64 as represented by line B–C in FIG. 3. Therefore, upon initial actuation of the solenoid valve 96 the pressure level in the outlet chamber 30 falls rather abruptly for a relatively short period of time, and thereafter pressure bleeds from the outlet chamber at a relatively low rate through the orifice established between lip 46 and face seal 40. Pressure continues to bleed through this orifice until a pressure build cycle is initiated, or until the brakes of the vehicle are released or until the pressure forces acting on piston 36 are less than the force of spring 56. When this occurs, lip 46 seals against seal 40 to maintain a minimum pressure level in chamber 30, as represented by line C–D in FIG. 3.

When the controlled wheel accelerates to a predetermined level, the electronic control unit signals the solenoid valve 96 to move the valve member 100 into sealing engagement with the valve seat 90, thereby permitting fluid communication through the passage 94 between the chambers 30 and 54. Since equal pressures again act across the piston 48, the lip 46 is driven into sealing engagement with the face seal 40 to terminate communication between the chamber 30 and the exhaust port 18. However, since the fluid pressure in the inlet chamber 28 is greater than the fluid pressure level in the outlet chamber 30, the sum of the forces due to fluid pressure acting upon the annular surface 44 and the force of the spring 42 urges seal 40 into sealing engagement with the valve seating member 26. However, limited fluid communication is permitted between the inlet and outlet chambers through the orifice 58, thereby allowing the fluid pressure level in the outlet chamber 30 to increase at a controlled rate and build brake pressure in the brake chamber 22 as represented by line E–F in FIG. 3. Fluid continues to bleed through the orifice 58 until another pressure decay cycle is initiated by the electronic control, or until the brakes of the vehicle are released, or until the pressure levels in the chambers 28 and 30 become substantially equal to one another as represented by point F in FIG. 3, thereby permitting the force of the spring 56 to urge the face seal 40 away from the valve seating member 26.

DETAILED DESCRIPTION OF THE ALTERNATE EMBODIMENT

Referring now to the embodiment of FIG. 2, elements substantially the same as those in the preferred embodiment retain the same reference character but are increased by 200. In FIG. 2, a floating piston 312 is slidably disposed in the bore 268 and defines a first compartment 314 and a second compartment 316 between opposite sides of the piston 312 and corresponding ends of the bore 268. A spring 318 disposed in the compartment 314 yieldably urges the piston 312 to the left viewing FIG. 2. The compartment 316 is communicated to the control chamber 254, and the chamber 314 is communicated with the passage 284, which also communicates with another chamber 320 that houses the spring 256. The flow-restricting orifice 322 prevents limited flow of fluid between the chambers 314 and 320 with the exhaust port 218.

In operation it will be noted that the size of the compartment 316 increases as the fluid pressure level in the control chamber 254 increases, and the size of the chamber 314 simultaneously decreases. Therefore, the size of the chamber into which the fluid in the control chamber 254 is exhausted when the solenoid valve 296 is actuated will decrease as the pressure in the chamber 254 increases. Since the amount of pressure drop in the chamber 254, and therefore, the pressure differential across the piston 248, is proportional to the size of the chamber into which pressure in the chamber 254 is exhausted, pressure in the outlet chamber 230 will be exhausted at a lesser rate when the initial pressure in the outlet chamber 230 is high and at a greater rate when the pressure in the chamber 230 is relatively low.

After the initial abrupt drop in pressure, fluid continues to exhaust from chamber 314 and passage 284 through orifice 322. The pressure in the chambers 254, and therefore the pressure in chamber 230, will continue to drop at a controlled rate.

We claim:
1. In a modulator for an adaptive braking system:
a housing defining a bore therewithin having an inlet port, an outlet port, and an exhaust port;
pressure responsive valve means within said bore for controlling communication between said inlet port and said outlet port and between said outlet port and said exhaust port;
said pressure responsive valve means including a valve seating member dividing said bore into an inlet chamber and an outlet chamber, first and second valve members cooperating with said valve seating member, first resilient means yieldably urging said first valve member into sealing engagement with said valve seating member to prevent fluid communication between said inlet and outlet ports, second resilient means yieldably urging said second valve member into sealing engagement with said first valve member to terminate communication between said exhaust port and said outlet port and thereafter urging said second valve member away from said valve seatng member to permit communication between said inlet and outlet ports;
said second valve member including piston means slidable in said housing and moving therein in response to differential fluid pressure across said piston means to thereby shift said second valve member; and
electrically operated valve means shiftable from a first position communicating substantially equal pressures across said piston means to a second position communicating a differential pressure across said piston means whereupon said second valve member permits said first resilient means to urge the first valve member into sealing engagement with said seat to prevent fluid communication between said inlet and outlet ports.
2. The invention of claim 1; and
a flow restrictng orifice extending through said valve seating member to permit limited fluid communication between said inlet and outlet ports when the first valve means engages said valve seating member.
3. The invention of claim 1:
said piston means being slidably mounted in said outlet chamber and dividing the latter into first and second sections between said valve seating member and one side of said piston means and between the opposite side of said piston means and the end of the bore, respectively;
said outlet port communicating with said first section; and
passage means communicating said first section with said second section;
said electrically operated valve means normally permitting uninhibited fluid communication between said sections, but being actuable to terminate fluid communication between said first and second sections and to relieve the pressure in said second section whereby the higher fluid pressure in said first section urges said piston means away from said valve seating member.
4. The invention of claim 1:
said first valve member having a pressure responsive area exposed to the fluid pressure level in said inlet chamber whereby said first valve member is maintained in sealing engagement with said valve seating member as long as the fluid pressure level in the inlet chamber exceeds the fluid pressure level in the outlet chamber by a predetermined amount.
5. The invention of claim 1; and
valve means disposed between said inlet port and the inlet chamber permitting uninhibited fluid communication therebetween as long as the fluid pressure level at the inlet exceeds the fluid pressure level in the inlet chamber, but venting the inlet chamber to said exhaust port when the fluid pressure level in the inlet chamber exceeds the fluid pressure level at the inlet.
6. The invention of claim 1:

said first valve member defining a passage extending therethrough communicating with said exhaust port, and resilient means circumscribing said passage at one end of said first valve member for sealing engagement with said valve seating member.

7. The invention of claim 1:
said first and second valve members controlling communication between said outlet port and said exhaust port;
said piston means being responsive to actuation of said electrically operated valve means to said second position to open said valve members to initiate communication between said outlet port and said exhaust port to thereby reduce the pressure level in said outlet chamber.

8. The invention of claim 7; and
means within said housing for regulating the rate of brake pressure reduction in said outlet chamber upon shifting of the electrically actuated valve means to the second position, said regulating means providing an initial brake pressure reduction at a greater rate followed by a subsequent brake pressure reduction at a lesser rate.

9. The invention of claim 8; and
pressure increase control means within said housing responsive to return of said electrically actuated valve means to said first condition to increase braking pressure at a lesser initial rate followed by a subsequent brake pressure increase at a greater rate.

10. In a modulator for an adaptive braking system:
a housing defining a first bore therewithin having an inlet port, an outlet port, and an exhaust port;
first valve means within said first bore for controlling communication between said ports, said first valve means including piston means responsive to a pressure differential between said outlet port and a control chamber within said housing;
said first valve means being actuable from a first position preventing fluid communication through said exhaust port to a second position terminating fluid communication between said inlet and outlet ports and permitting fluid communication between the outlet and exhaust ports at a controlled rate;
means defining another chamber within said housing communicated to said control chamber; and
second valve means including electro-magnetic actuating means, said second valve means being actuable from a first position communicating said control chamber to the outlet port and preventing communication between said control chamber and said another chamber, whereby first valve means is maintained in said first position, to a second position communicating said control chamber to said another chamber and terminating communication between said control chamber and the outlet port, whereby the fluid pressure in said control chamber is exhausted into said another chamber thereby creating a pressure differential across said piston means to actuate said first valve means to its second position.

11. The invention of claim 10; and
a flow restricting orifice communicating said another chamber to the exterior of the housing at a controlled rate, whereby the pressure level at the outlet port decreases at a relatively rapid rate upon actuation of the second valve means until the pressure levels in said control chamber and said another chamber equalize and decreases at a lesser rate thereafter proportional to the rate of flow of fluid through said orifice.

12. The invention of claim 11:
said means defining said another chamber including a second bore within said housing, a plunger slidably mounted in said second bore having larger and smaller effective areas on opposite ends thereof, said another chamber being defined between the larger end of the piston and one end of the second bore, whereby fluid pressure acting on the larger effective area of the piston drives the latter from said one end of the bore to enlarge said another chamber when the second valve means is shifted to the second position, and resilient means yieldably urging said piston toward said one end of the second bore.

13. The invention of claim 12:
the smaller end of said plunger cooperating with the other end of said bore to define a compartment therebetween, there being an inlet adapted to communicate fluid into said compartment, and passage means extending through said plunger to communicate said compartment with said another chamber.

14. The invention of claim 13, and
means on the smaller end of said plunger cooperating with said inlet to define a flow restricting passage therebetween when fluid pressure in said another chamber drives said plunger away from said one end of the second bore, said flow restricting passages permitting flow of fluid into said compartment at substantially the same rate that fluid exhausts from said another chamber through said orifice.

15. The invention of claim 11:
said means defining said another chamber including a second bore within said housing, a floating piston in said bore defining said another chamber between one face of said floating piston and one end of the second bore and a compartment between the other face of said floating piston and the other end of said second bore, resilient means yieldably urging said floating piston toward said other end of the second bore, said compartment being communicated to said control volume, whereby the volume of said another chamber is decreased and the volume of said compartment is increased as the fluid pressure level in said compartment is increased.

16. The invention of claim 11:
said first valve means including a valve seating member dividing said first bore into an inlet chamber and an inlet chamber and an outlet chamber, first and second valve members cooperating with said valve seating member, first resilient means yieldably urging said first valve member into sealing engagement with said valve seating member to prevent fluid communication between said inlet and outlet ports, second resilient means yieldably urging said second valve means into sealing engagement with said first valve means and thereafter urging said second valve member away from said valve seating member to permit communication between said inlet and outlet ports.

17. The invention of claim 16:
said first valve member having a pressure responsive area exposed to the fluid pressure level in said inlet chamber whereby said first valve member is maintained in sealing engagement with said valve seating member as long as the fluid pressure level in the inlet chamber exceeds the fluid pressure level in the outlet chamber by a predetermined amount.

18. The invention of claim 16:

said first valve member defining a passage extending therethrough communicating with said exhaust port, and resilient means circumscribing said passage at one end of said first valve member for sealing engagement with said valve seating member.

* * * * *